March 25, 1952     G. L. TURNER ET AL     2,590,355
INDUSTRIAL TRUCK

Filed Aug. 6, 1947     6 Sheets-Sheet 1

Inventors:
George L. Turner,
Fred Sherriff
By Walter E. Schirmer
Att'y.

March 25, 1952 G. L. TURNER ET AL 2,590,355
INDUSTRIAL TRUCK
Filed Aug. 6, 1947 6 Sheets-Sheet 3

Inventors:
George L. Turner,
Fred Sherriff
By Walter E. Schirmer
Att'y.

March 25, 1952 G. L. TURNER ET AL 2,590,355
INDUSTRIAL TRUCK
Filed Aug. 6, 1947 6 Sheets-Sheet 4
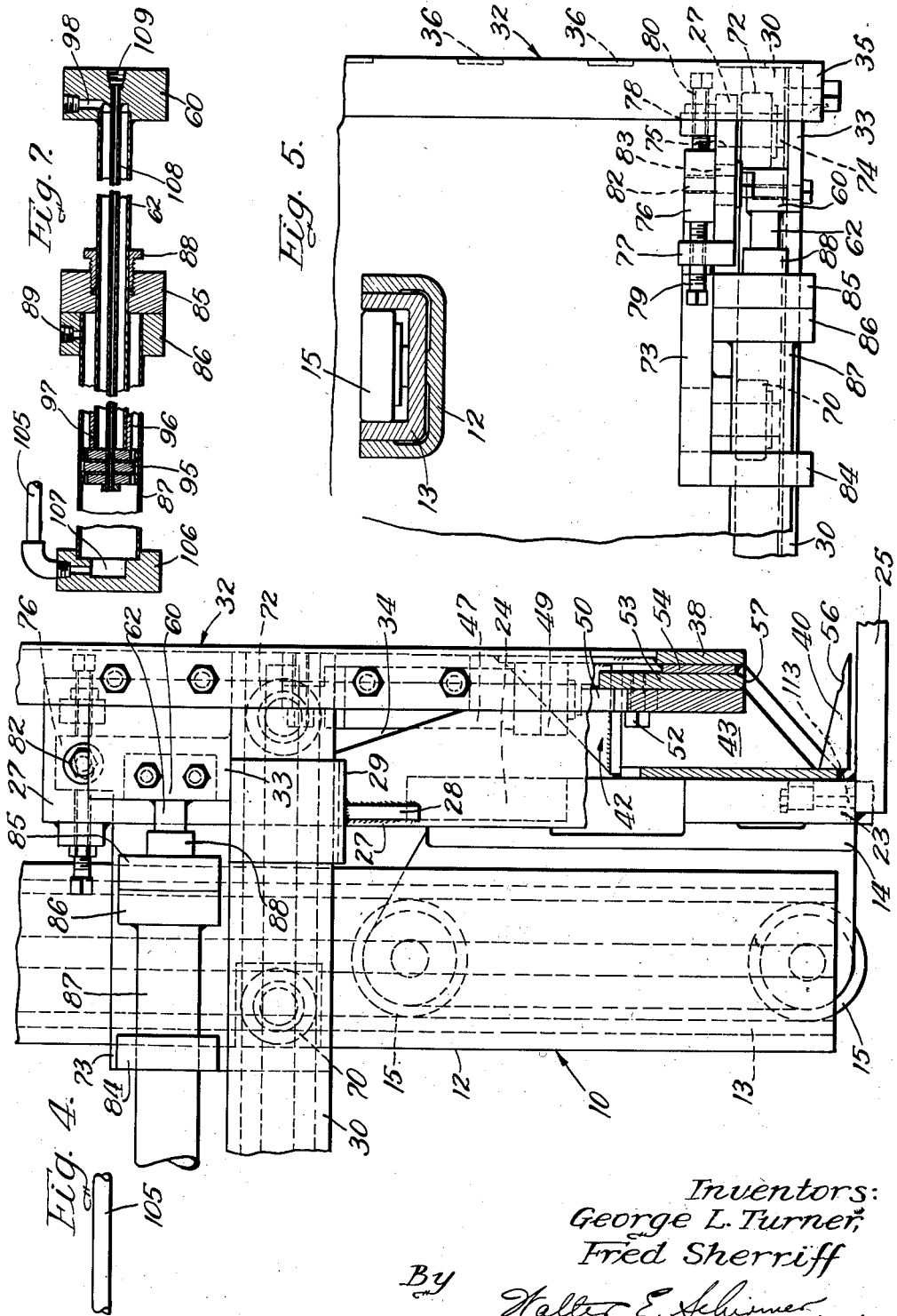
Inventors:
George L. Turner,
Fred Sherriff
By Walter E. Schimmer
Atty.

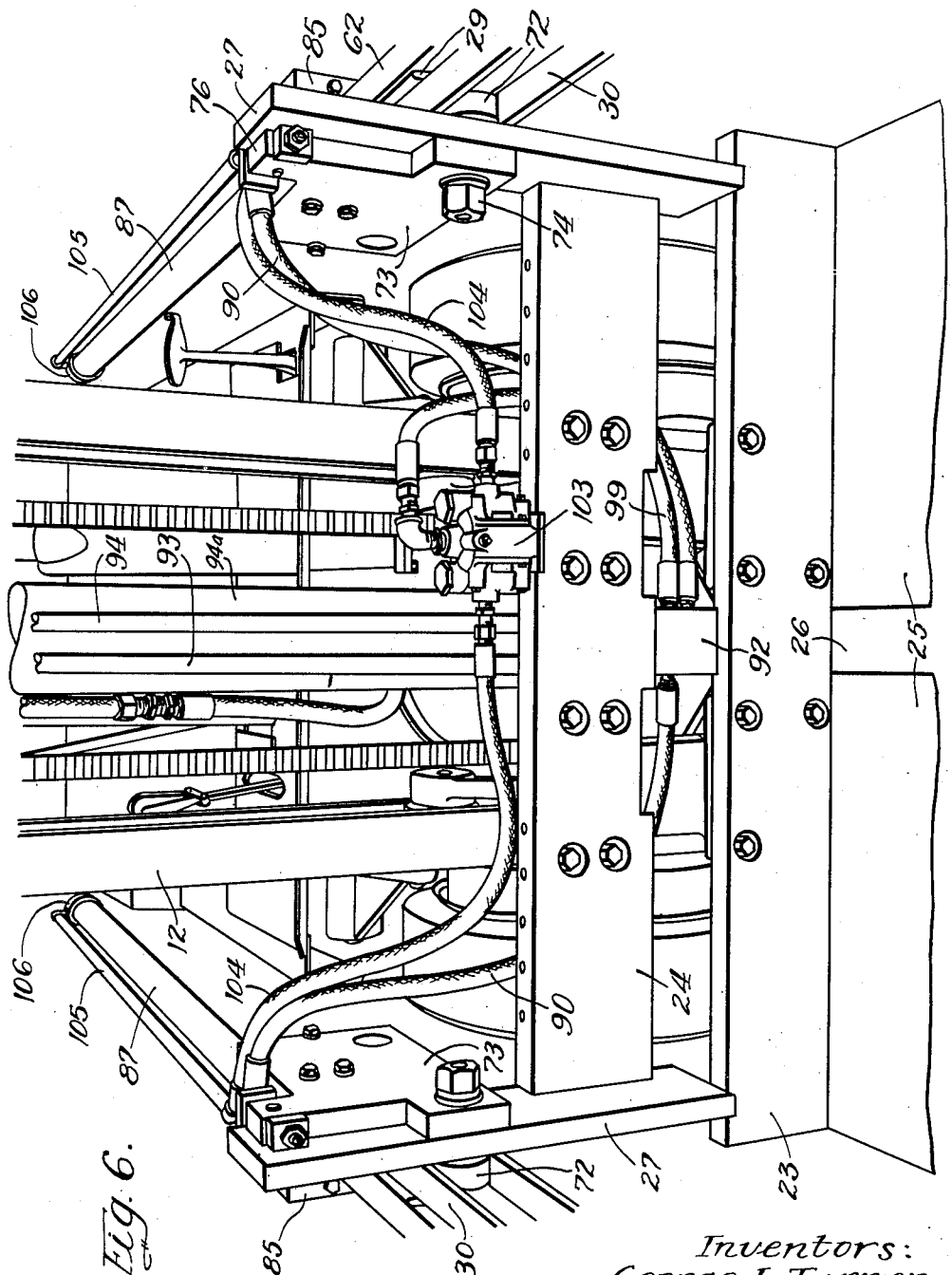

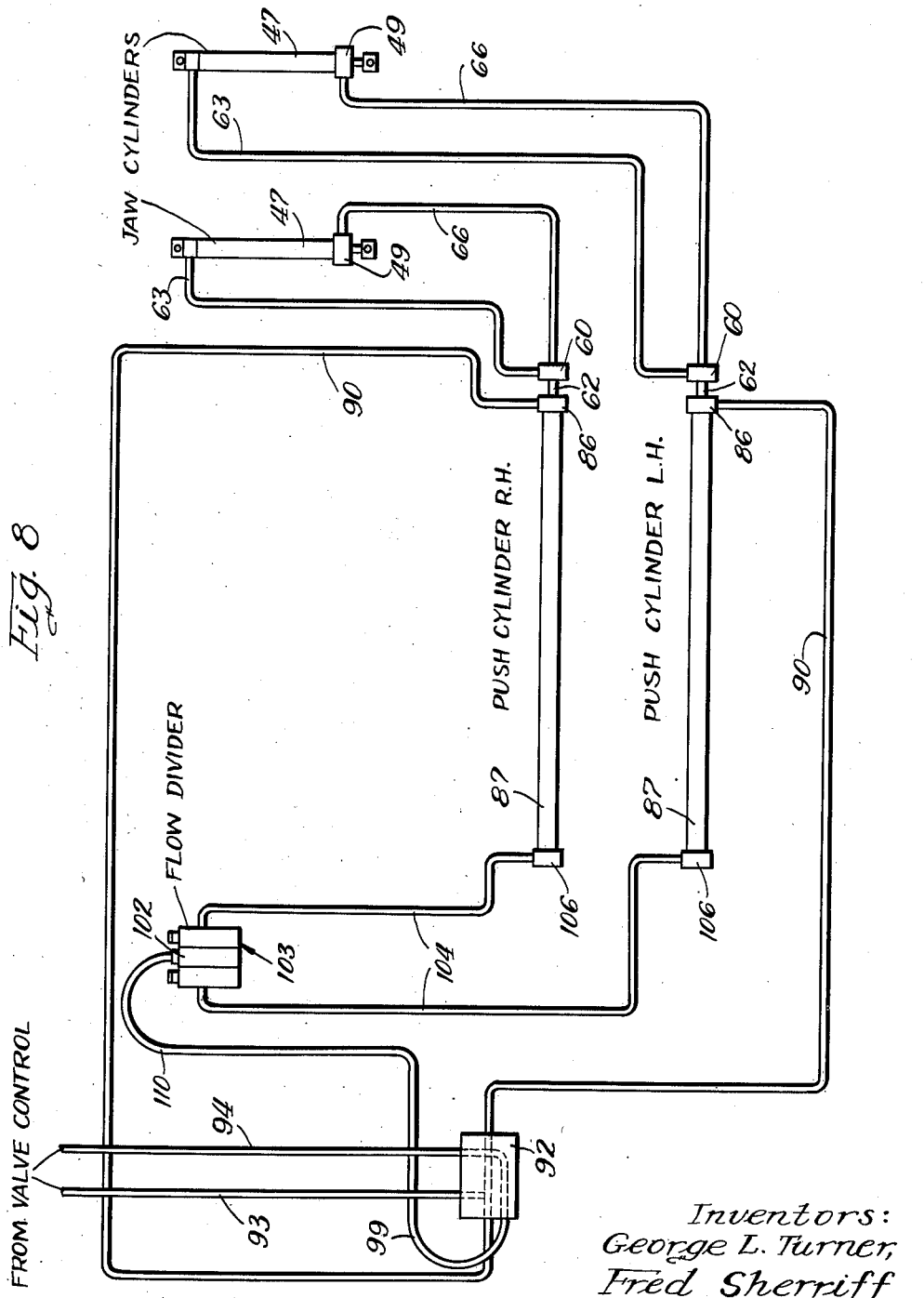

Patented Mar. 25, 1952

2,590,355

UNITED STATES PATENT OFFICE 2,590,355

INDUSTRIAL TRUCK

George L. Turner and Fred Sherriff, Battle Creek, Mich., assignors to Clark Equipment Company, Buchanan, Mich., a corporation of Michigan Application August 6, 1947, Serial No. 766,558

15 Claims. (Cl. 214—113)

This invention relates to industrial trucks and more particularly is concerned with an industrial truck provided with means for drawing a unit load of material onto the load supporting members of the truck and for pushing the same off said members in conjunction with a load elevating and tilting mechanism mounted at the forward end of the truck.

Primarily, the present invention is directed to an improved industrial truck for carrying out the method disclosed in the co-pending application of George L. Turner, Serial No. 717,769, filed December 12, 1946, and is an improvement over the truck construction disclosed in the co-pending application of George L. Turner, Serial No. 719,969, filed January 3, 1947, and now Patent No. 2,583,977 granted January 29, 1952.

The present invention contemplates broadly, a modification of the pushing and clamping mechanism disclosed in the second of the aforementioned applications, whereby the weight of such mechanism is materially reduced, the operation thereof is accelerated, and refined, and the cost of such mechanism is materially reduced. In addition, the present construction allows the adaptation of this type of mechanism to industrial trucks of the fork type now in use, so that it can be employed either on original equipment or as a field kit for installation on trucks already in use.

Broadly speaking, the present invention comprises a pusher rack mounted for extension and retraction relative to the load supporting carriage mounted for vertical movement in the uprights at one end of the truck, which rack is supported by means carried entirely by the carriage and is so arranged as to be projected forwardly or retracted rearwardly through hydraulic control devices under the remote control of the operator.

Another feature of the present invention is to provide a pusher rack supporting assembly mounted on the load supporting carriage and including roller mounted channel members for supporting the rack as it moves forwardly and rearwardly and a hydraulic motor assembly superposed on and extending parallel to the rack supporting channels. In combination with this mechanism, there is provided a blade type clamping mechanism carried by the pusher rack and operated from the driver seat for grabbing the extending edge of a sheet-like pallet upon which the load is supported, whereby the pallet with its load may be drawn onto the load supporting plates through this clamping mechanism, and yet when it is desired to move the load, the clamp automatically is opened allowing the pushing of the load off the load supporting members into a box car, into a warehouse or into any similar storage location.

The device is adaptable for use where several tiers of loads are to be stored or withdrawn from storage and can be used at any height to which the load supporting carriage can travel on the vertical mast. In this connection, means is provided in the mechanism for increasing the visibility so that the operator may readily line up the mechanism, even at extreme heights, for grabbing the uppermost of several tiered stacks of unit loads.

Another feature provided by the present invention is the ability of the pusher rack to travel beyond the end of the load supporting means so that the operator may view the engagement of the projecting flap of the sheet-like pallet by the clamping mechanism free of any interference with his vision by the load supporting means.

Still another feature of the present invention involves the simplification of the hydraulic fluid lines leading to the clamp actuating mechanism and to the push and pull mechanism for the rack, with the addition of flow dividing means interposed in the hydraulic circuit for insuring that the rack will move forwardly and readwardly without any cocking or binding action. In conjunction with this feature, guide means are provided for maintaining the rack centered with respect to the load supporting members during its movement.

A still further feature of the present invention is the provision of a positive acting clamp blade engaged with a fixed clamp jaw carried by the rack, the blade moving vertically under hydraulic control for clamping or releasing the extending flap of the pallet and providing a positive crimping action upon the projecting flap of the pallet to insure a positive grabbing of the pallet throughout the length of the clamp, whereby appreciably greater clamping action can be exerted than is possible with previous devices wherein a mechanical type of clamping action was provided.

Another advantage secured by the present invention is the incorporation of certain of the fluid lines within the piston rod which actuates the pusher rack, thereby eliminating extra fluid lines which require additional support and which may be crimped or damaged in the actuation of the mechanism.

A still further feature of the present invention is the provision of adjustment means for mounting the rack and its actuating mechanism relative to the load supporting carriage, whereby the rack can be adjusted so that as it extends forwardly, it will just clear the end of the load supporting members or can be made to assume any selected angular movement relative to the surface of the load supporting members depending upon the operation required.

A still further advantage secured by the present invention is the provision of a construction whereby the removal of one of two transverse plates forming a standard part of the load supporting carriage allows removal of the rack and its actuating mechanism, while the removal of the other of said transverse plates provides for conjoint removal of the special load supporting members, whereby the entire mechanism can be removed from the load supporting carriage in a matter of a few minutes and standard fork supporting transverse plates can be installed on the carriage so that the truck can be employed for normal fork truck operation.

Other advantages of the present construction will become more apparent from the following detailed description which, taken in conjunction with the accompanying drawings, will disclose to those skilled in the art, the preferred construction and operation of one form of the present invention.

In the drawings:

Figure 4 is a detail view with portions broken away showing the mounting of the mechanism upon the load supporting carriage.

Figure 5 is a top plan view of the mounting arrangement shown in Figure 4.

Figure 6 is a front perspective view of the supporting mechanism for the pusher rack with the rack in extended position.

Figure 7 is a detail sectional view through the pusher cylinder and piston arrangement at one side of the vehicle; and Figure 8 is a diagrammatic view of the hydraulic control circuit for this mechanism.

Figure 1:
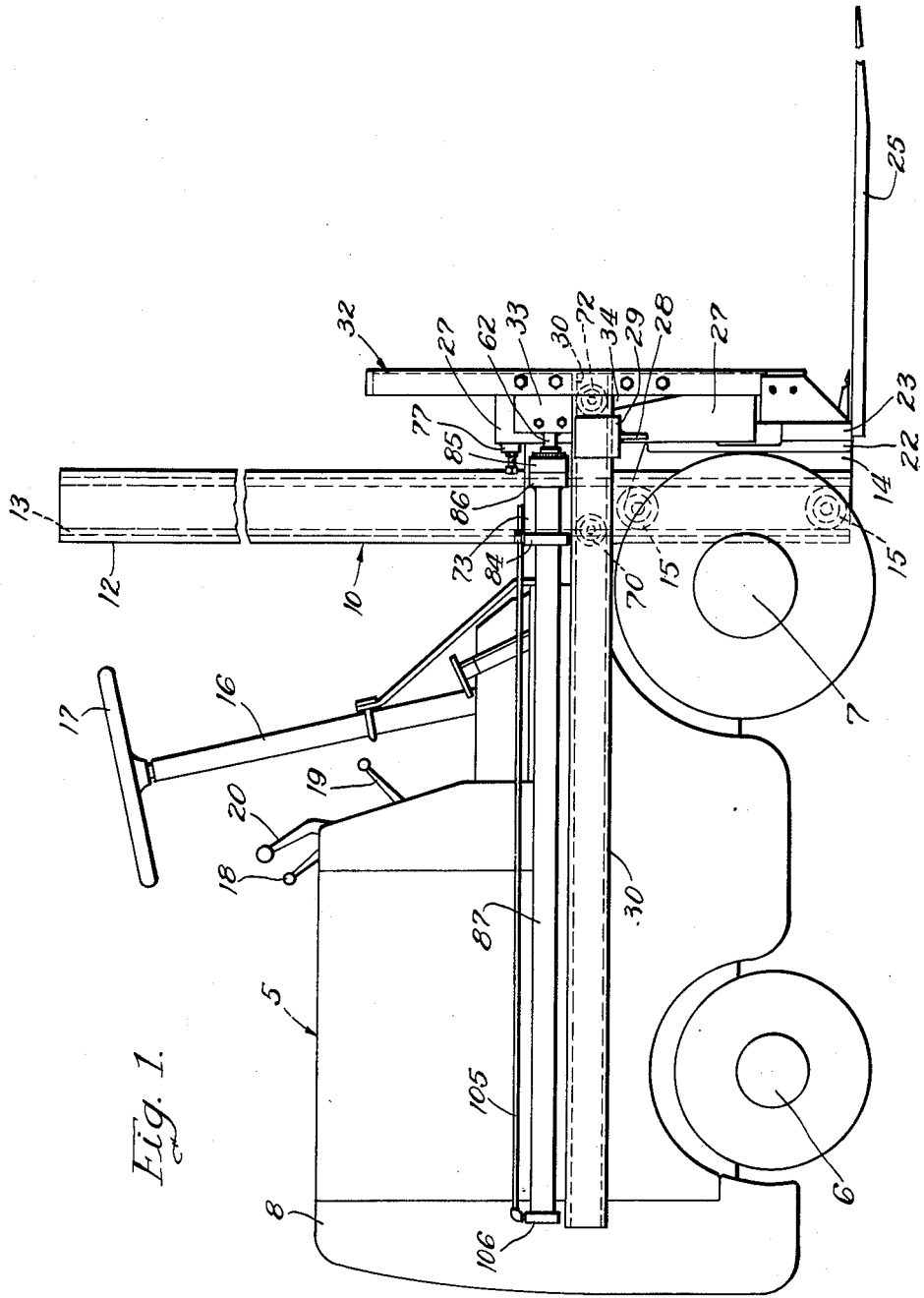
Figure 1 is a side elevational view of a conventional type of industrial truck provided with the present invention.

Referring now in detail to the drawings, there is disclosed in Figure 1, an industrial truck, indicated generally at 5, having the steering axle 6, and the driving axle 7, supporting the vehicle, a suitable counterweight of conventional design, shown at 8, at one end of the vehicle, and at the opposite end of the vehicle, there is disposed a vertical mast, indicated generally at 10, comprising telescopically arranged channel-like upright members 12 and 13, which are pivotally mounted adjacent the lower end thereof on the chassis of the vehicle and which include a hydraulic cylinder interposed therebetween for raising and lowering the load supporting carriage, indicated generally at 14. This carriage is mounted by means of suitable rollers 15, within the inner telescoping uprights 13, and through suitable cable means controlled by the hydraulic cylinder, may be raised and lowered relative to the mast, with the inner upright 13 telescoping upwardly from the stationary upright for extreme high lift.

The details of this type of mechanism are more or less conventional, and it is not believed necessary to describe the same specifically herein. This mechanism, for example, may be of the type which is disclosed in detail in the copending application of Alfred Wayne Gunning, Serial No. 752,593, filed June 5, 1947, and now Patent No. 2,514,052 granted July 4, 1950.

The vehicle is provided with a steering column 16 at the upper end of which is the conventional steering wheel 17 and is also provided with suitable control levers 18, 19, and 20 for controlling the vertical movement of the load supporting carriage 14, for controlling the tilting of the upright assembly 10 and for controlling the actuation of the pusher and clamping mechanism, the control for this being illustrated, for example, by the control lever 19. The vehicle, of course, is provided with conventional clutch and brake pedals and with a suitable gear shift control for moving the vehicle either forwardly or rearwardly. However, the details of this driving mechanism for the vehicle are not believed pertinent to the present invention and are not disclosed in detail.

Figure 2:
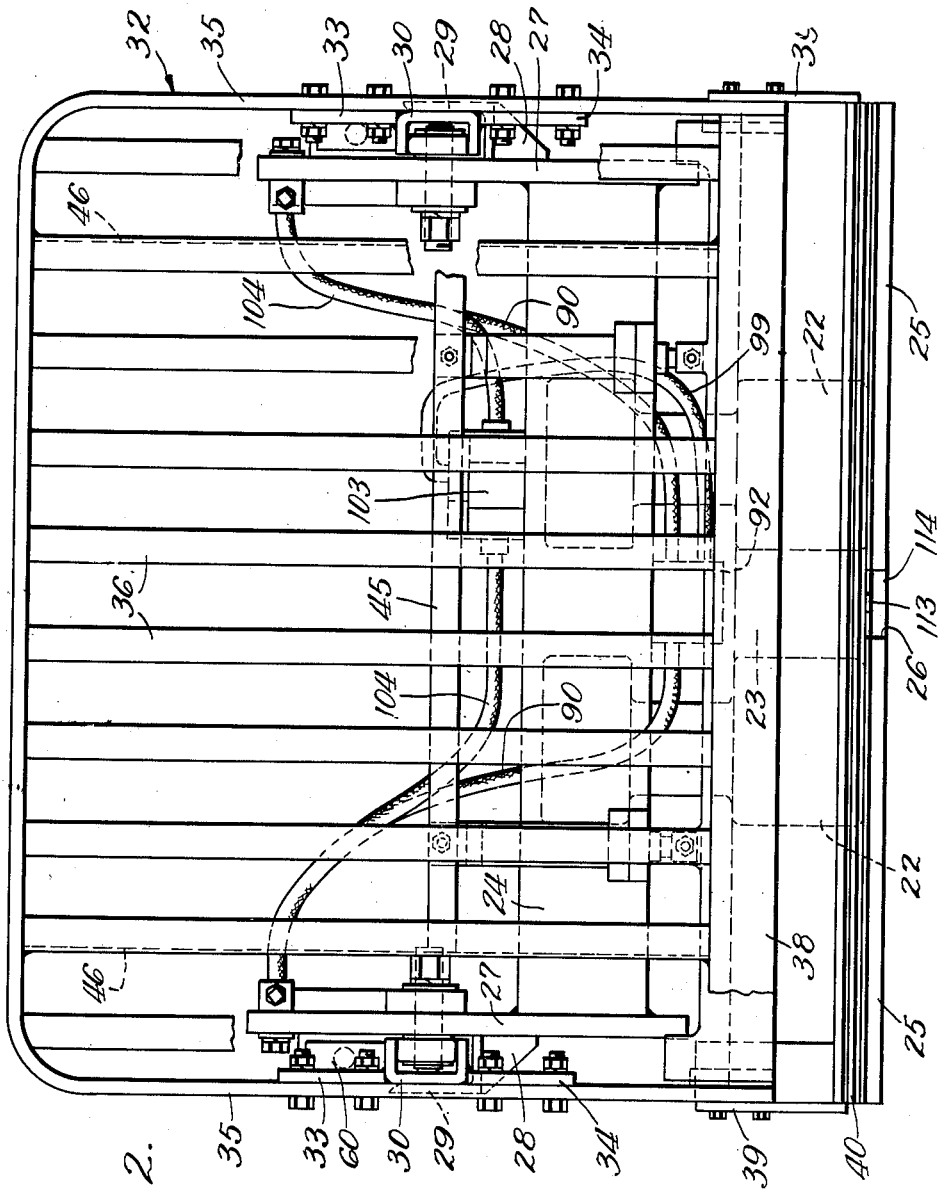
Figure 2 is a front elevational view of the pusher rack and clamping mechanism shown in Figure 1.

The load supporting carriage 14, is provided with two forwardly extending boss portions 22, shown in dotted lines in Figure 2, to which are bolted the transversely extending vertically arranged plates 23 and 24. The plate 23, which is on the lowermost boss portion of the carriage 14, has welded thereto forwardly extending plate members 25, which are of appreciable width, as shown in Figure 2, and which are spaced apart at their center, as shown at 26, these members forming the supporting surface upon which the loads to be handled by the vehicle are carried during transit. The plates 25 are in the form of laterally widened fork members which are welded or otherwise suitably secured to the lower end of the plate 23 and which preferably have tapering end portions of reduced thickness.

The plate 24, at its ends, has welded thereto, normally extending frame members 27, which project upwardly from this plate and are rigidly secured thereto. The frame members 27 are provided on their outer surfaces, with gusset plates 28, which, in turn, carry angular members 29, forming a guide or support for the channels 30, supporting the pusher rack, indicated generally at 32. The channels 30, as indicated in Figure 1, are of appreciable length and extend rearwardly of the load supporting carriage on the outboard sides of the upright assembly 10, in substantially a horizontal plane spanning the sides of the truck. The channels 30, of course, are not secured to the plate or frame member 27, which is stationary relative to forward and reverse movement of the pusher rack 32. These channels, at their forward ends, are welded to suitable plate members 33 and 34 forming brackets bolted or otherwise secured to the side members 35 of the pusher rack 32.

Figure 3:
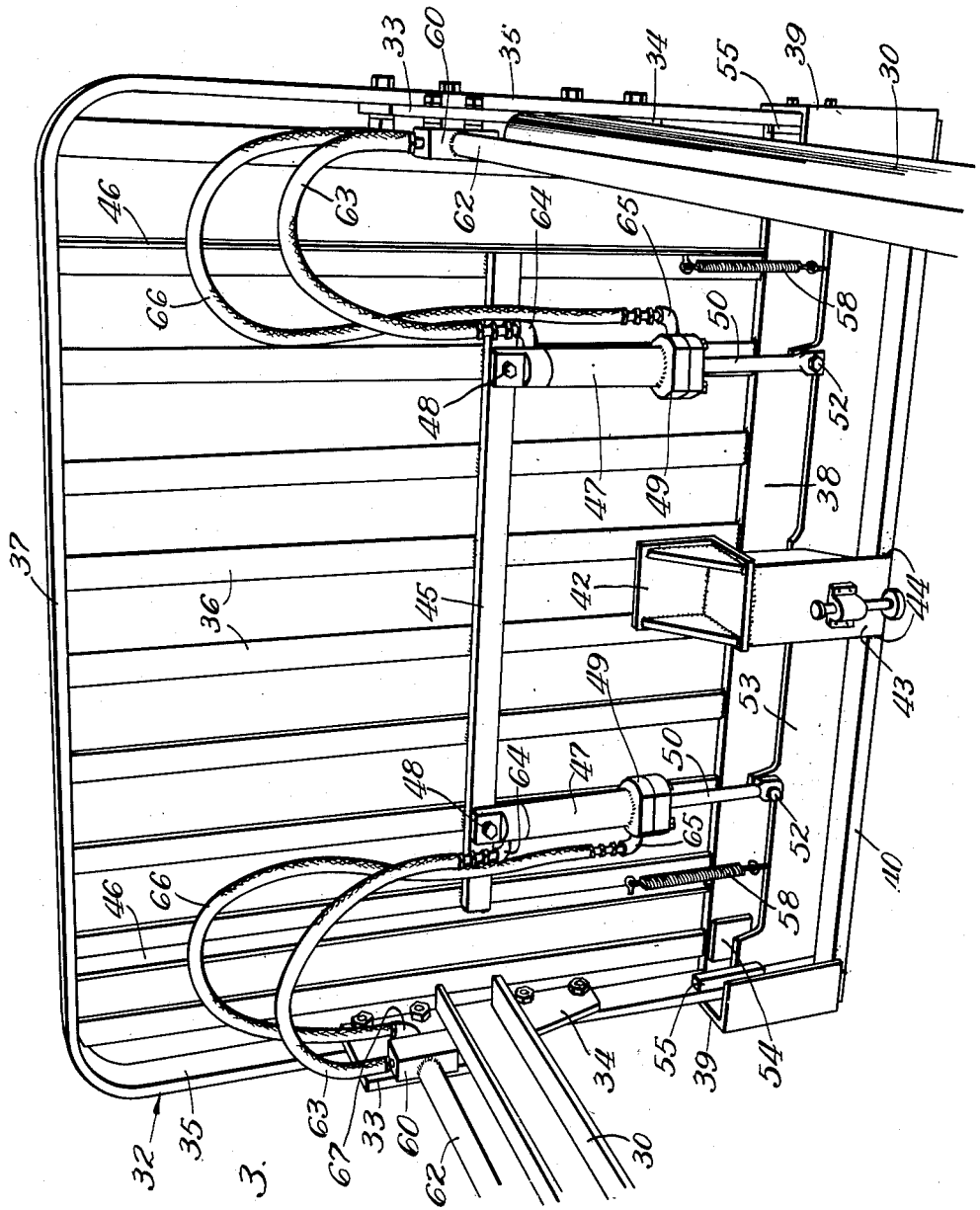
Figure 3 is a rear perspective view of the pusher rack and clamping mechanism in extended position.

The detailed structure of the brackets 33 and 34 is believed more clearly shown in Figure 3. The pusher rack 32, comprises a generally rectangular frame member, which is provided with a plurality of laterally spaced vertically extending bar members 36, welded or otherwise secured at the upper ends to the upper transverse portion 37 of the pusher rack, and at their lower ends are secured to the transverse plate 38, closing the bottom of the pusher rack. The plate 38 extends transversely between the lower ends of the side frames 35 of the rack. The lower ends of these members 35 are also provided on their outboard sides with angularly shaped bracket members 39, shown clearly in Figure 3, which members extend rearwardly and inwardly behind the rack 32 and form a support for the stationary transversely extending jaw member 40. This jaw member is also supported at its center portion by means of the reinforced angular bracket 42, secured to the vertical bars 36 and comprises a built up section extending rearwardly and downwardly, as indicated at 43, to be welded at its lower end, as indicated at 44, to the center portion of the stationary blade 40 of the clamp.

Intermediate the ends of the vertical bars 36, there is provided the transverse bar 45, which has its ends abutting against rearwardly extending bars 46, adjacent the sides of rack 32. The bar 45 is adapted to form a mounting for the upper ends of the two jaw cylinders 47, these cylinders being secured to the bar by means of the studs 48, whereby they are fixed in position on the rear face of the rack 32. The head end 49 of the cylinders 47 forms a packing gland for the extending piston rods 50, which project therefrom, and at their free ends are bolted as by means of the bolts 52 to suitably bossed portions of a blade member 53. The blade member 53 is mounted for vertical movement between suitable pads 54, carried on the rear surface of the bottom plate 38 of the rack and guide members 55 secured to the side elements 35 of the rack. The blade is thereby arranged for vertical sliding movement relative to the fixed element 40 of the clamping mechanism, and it will be noted that this element, as shown in detail in Figure 4, is provided with a recessed transverse groove 56, which cooperates with the rounded edge 57 of the blade member 53 to provide a firm crimping action upon the extending flap of the sheet-like pallet upon which the load is supported.

Suitable springs 58 are interposed between the blade member 53 and the rack 32, preferably being anchored at their ends on the bar members 46 of the rack to assist in retracting the blade when the rack moves forwardly.

As is clearly shown in Figures 2 and 3, the channels 30 are interposed between the brackets 33 and 34, whereby the channel 30 has the rack 32 rigidly secured thereto, thereby holding the rack against any tilting movement. Disposed immediately above the channel and suitably secured on the bracket 33, is a terminal block member 60, into which the head end of the piston rod 62 is secured as by welding or the like. The terminal block 60, forms means for transmitting oil under pressure from within the tubular piston rod 62 to the jaw actuating cylinders 47, there being one connection from the upper end of the terminal block through the conduit 63 to the fixed ends of the cylinders 47, suitable fittings 64 connecting this conduit with this end of the cylinders.

The head portions 49 of the cylinders are provided with suitable fittings 65 which, through the conduits 66, are connected to fittings 67, carried by and extending into the terminal blocks 60. The details of these connections and the manner in which they receive their fluid supply will be disclosed in connection with a detailed description of Figure 7. Suffice it to say that with this construction, fluid under pressure is transmitted through the tubular piston rod 62 and terminal block 60 to the conduit 63 for actuating the pistons 50 to move the blade 53 downwardly into clamping position.

When it is desired to remove the clamping pressure, fluid is forced through the conduits 66 to the opposite end of the cylinders 47, thereby retracting the pistons 50 and the fluid from the opposite end of the cylinders 47 is discharged back to the sump or valve through the conduit 63.

Considering now the mounting of the rack and channel members relative to the load supporting carriage, this is shown in more detail in Figures 1, 2, 4, and 5. The frame member 27, as has been previously described, extends vertically at each end of the transverse plate 24 and carries the angular member 29 as a guide for the channel 30. The channels, themselves, are supported for forward and reverse movement on suitable rollers 70 and 72 carried by an adjusting plate or bracket member 73, shown more in detail in Figure 5. The plate 73 is provided with suitable studs forming pivotal mountings for the rollers 70 and 72 and the stud 74, which carries the roller 72 has a cylindrical portion, indicated at 75 in Figure 5, forming a pivotal support for the brackets 73 upon the frame member 27.

Thus the center of the roller 72 and the pivotal mounting of the brackets 73 are co-axial. The bracket 73 is provided with a vertically extending boss portion 76, which, as shown in Figure 4, extends upwardly between the two bosses 77 and 78, carried on the inner face of the frame member 27. This extension 76 of the plate 73 is for the purpose of adjusting the relationship of the brackets 73 relative to the frame 27, allowing pivotal movement about the portion 75 of this stud 74 by means of the adjusting screws 79 and 80, carried by the bosses 77 and 78, respectively, which provide for moving the extension 76, either forwardly or rearwardly to raise or lower the roller 70 relative the roller 72.

When adjusted in proper position, a suitable transverse bolt 82 is threaded into the extension 76 for clamping it in fixed position, the bolt 82 extending through a slot 83, formed in the upper end of the frame member 27. It will be noted that in the retracted position of the pusher rack, as indicated in Figure 4, the rack is positioned with the fixed clamp plate 40 slightly above the surface of the load supporting members 25. By the angular adjustment described, there is provided means for allowing the rack to move forwardly at a slight angle relative to the surface of the members 25, so that when the rack reaches the forward ends of these members it just clears the members thereby moving downwardly at a slight angle relative the surface of the members 25 as it is projected forwardly. This is provided by moving the rear roller 70 slightly above the horizontal plane through the forward roller 72, through the adjustment just described.

The bracket member 73 also forms a support for the cylinder which carries the piston rods 62. This support is provided by means of a rear supporting bracket 84, welded or otherwise secured to the surface of the plate 73, and a forward supporting bracket 85 to which the head end 86 of the cylinder 87 is secured. The bracket 85 is also secured to the surface of plate 73 and is preferably provided with a suitable packing gland 88, receiving the piston rod 62. The cylinder 87 extends rearwardly from the plate 73 slightly above and parallel to the rearward extension of the channel 30 and is substantially co-extensive in length therewith when the rack is in retracted position. This cylinder is adapted to receive at its head end 86, a fluid connection extending through the opening 89 receiving a conduit 90 leading from the head end of the cylinder 87 to a terminal block 92, mounted on the under side of the top transverse plate 24, as shown in detail in Figure 6.

From this terminal block a fluid conduit 93 extends upwardly over a crosshead carried by the cylinder 94a, disposed between the uprights 12 and thence rearwardly to a control valve section of the hydraulic system of the truck controlled by the lever 19 for admitting fluid alternately under pressure either into the cinduit 93 or into parallel conduit 94, also leading to the terminal block 92 from the control valve. It will be noted that the port 89 for the cylinder 87 introduces fluid into the interior of the cylinder ahead of the piston head 95 for the piston rod 62. Thus fluid under pressure entering through this port from conduit 90, tends to retract the piston.

At the same time, it will be noted from Figure 7, that the spacer sleeve 96, which surrounds the tubular piston rod 62, adjacent its head end, is provided with port 97, which extends through the spacer sleeve and also through the wall of the tubular piston rod 62 into the interior of this rod. At its free end, the interior of this tubular rod 62, is in communication with the passageway 98, which leads through the terminal block 60, to the conduit 63, extending into the upper ends of the terminal block 60. The spacer sleeve also provides means for limiting the forward movement of the rack relative to the load carriage.

Thus, when pressure is employed to retract the piston 62 and thereby pull the rack rearwardly, this pressure first flows through the opening 97 within the piston rod and thence through the conduit 63 to actuate the jaw cylinders 47 for forcing the blade 53 downwardly into firm clamping engagement with the extending end of the pallet, and this pressure is built up prior to the pressure being built up for retracting the piston. As a result, the clamping action is effected and as this pressure builds up, the piston then starts to move rearwardly to retract the rack 32 and consequently pull the load carried by the pallet onto the supporting member 25.

When fluid under pressure is transferred from the conduit 93 to the conduit 94 by actuation of the control 19, this fluid flows through the terminal block 92 and thence by means of the conduit 99, into the center section 102 of a flow divider, indicated generally at 103. This flow divider, which is of a standard type such as manufactured by Pesco Products Division of Borg-Warner Corp. at Toledo, Ohio, divides the flow of fluid coming from the conduit 94 into the fluid lines 104 which lead respectively through the pipes 105 shown in Figure 6, to the rear ends of cylinders 87, entering into these cylinders through the end members 106, and thence through the passageway 107, into the interior of the cylinder 87, against the head end of the piston 95.

However, it will be noted that the tubular piston rod 62, has disposed therein, a second tubular member 108, which extends through the piston head 95 and has an opening into the rear end of the cylinder 87. Consequently, fluid under pressure from the flow divider 103 enters into the rear end of the cylinder 87 and flows through the rod 108 into the port 109 of the terminal block 60, and from this port, through fittings 67 and conduit 66 into the head end of the jaw cylinders 47, thereby operating to retract piston rods 50 raising the blade member 53 from clamping position.

This action is assisted by means of the spring members 58 so that the blade is quickly released, and as pressure builds up within the rear end of the cylinder 87, the piston 95 begins to move outwardly, whereby the rack pushes the load off the supporting members 25. The fluid in the cylinders 47, behind the pistons during this action, is evacuated through the conduits 63 and thence through the tubular piston 62 and port 97 into the conduit 90, and thence back through conduit 93 to the pressure developing source.

Similarly, when fluid under pressure is introduced into conduits 93, the control valve mechanism controlled by lever 19 opens conduit 94 to the suction side of the fluid developing source to allow evacuation of the rear ends of these cylinders 87 through pipes 105 and conduits 104 back into the flow divider and thence out through conduit 110 and conduit 99 to conduit 94.

This also results in the release of pressure from the head ends 49 of cylinders 47 through conduits 66, and thence through the tubular member 108, back into the same discharge circuit. The flow divider 103, works equally well under pressure or at atmospheric pressure and consequently insures that the extension and retraction of the pistons within the cylinders 87 will be uniform on both sides of the vehicle, thereby tending to prevent any cocking or binding of the rack and holding it in a substantially transverse position relative to its direction of movement. However, to insure that the rack will not be moved laterally relative the load supporting members 25, we preferably provide at the rear face of the bracket 43 and depending slightly below the undersurface of the plate 40 rearwardly thereof, a suitable vertically slidable stud member 113, carrying a roller 114, adapted to engage between the lateral edges of the plate members 25 in the gap 26 therebetween. This retains the rack against any tendency to be moved laterally, thereby insuring no binding action on the rollers 70 and 72 or upon the piston rod 62. The face plate 23 is preferably provided with a recess or opening into which the roller 114 projects when the rack is retracted.

Preferably, the roller 114 is of sufficient height and width so that it will engage in this gap regardless of the slight angular movement of the rack relative the supporting surfaces of members 25.

In operation, the driver of the vehicle moves the same to a position where the forward ends of the members 25 are immediately adjacent the forwardly extending flap on the sheet-like pallet upon which the load to be picked up is mounted. By operation of the lever 19, fluid is introduced into conduit 94 under sufficient pressure from the hydraulic fluid developing source carried by the vehicle to provide for outward movement of the pistons 62. This moves the rack forwardly but since at this time, the conduits 63 of the jaw cylinders 47 are open to atmosphere through the tubular piston rods 62 and thence through port 97 and conduit 90 into conduit 93, the blade member 53 stays in retracted position. The operator then allows this move to proceed until the fixed blade member 40 moves in under the extending flap of the pallet. He then reverses the position of the control lever 19 which opens the conduit 94 to discharge, and introduces fluid under pressure into conduit 93.

This results in forcing fluid under pressure through conduit 90 into the head ends of cylinders 87. This fluid then passes into the interior of cylinders 87 and through the port 97 into the interior of the piston rod 62. At the same time, the interior of tubular member 108 and the rear ends of cylinders 87 are open to discharge. As a result, fluid under pressure is introduced through conduits 63 into the jaw cylinders 47 to force the blade member 53 downwardly into clamping engagement.

As the clamping action is effectuated, the pressure builds up sufficiently to force the piston head 95 rearwardly within the cylinder 87. The rack member 32 thereby starts its retracting move, the channels 30 rolling rearwardly upon the rollers 70 and 72, while the clamping member draws the pallet with its load onto the supporting members 25. Inasmuch as the hydraulic circuit for actuation of the pistons 62 and the jaw cylinders is independently controlled with respect to the hydraulic circuit for the load supporting carriage 14 and for tilting of the uprights 10, it is apparent that the carriage can be moved to any vertical position relative the mast 10 and the pusher and clamping mechanism can be selectively actuated at any point.

Thus, loads can be picked up from the floor onto the load supporting members 25, raised in position and tiered in elevated position in warehouses, box cars or in any similar place, can be carried by the truck from one point to another and can be discharged from the truck without the operator ever leaving his seat. The gap between the two load supporting members 25, as well as the provision of having all of the actuating mechanism on the outboard sides of the uprights, allows the operator relatively clear vision for positioning the truck properly with respect to the load and for extending and retracting the rack to grab the extending flap of the pallet.

We are aware that various changes may be made in certain details of the construction herein disclosed without in any way departing from the scope and spirit of the present invention, and we therefore do not intend to be limited except as defined by the limitations of the appended claims.

We claim:

1. The combination, with the load supporting carriage of an industrial truck, of forwardly extending plate means for receiving the load to be transported, a vertical rack disposed above said plate means and having a transverse jaw member at the lower end thereof, arms secured to the sides of said rack and extending rearwardly therefrom, anti-friction guide means on said carriage mounting said arms for fore and aft sliding movement relative to said carriage, hydraulic means including a cylinder supported on said carriage and an extending piston rod directly connected to said rack, a vertically movable blade member carried by said rack, and hydraulic means carried by said rack for moving said blade into and out of clamping engagement with said jaw member.

2. The combination of claim 1 wherein said piston rod contains conduit means for conducting fluid under pressure to said blade actuating hydraulic means.

3. The combination, with the load supporting carriage of an industrial truck, of forwardly extending plate means for receiving the load to be transported, a vertical rack disposed above said plate means and having a transverse jaw member at the lower end thereof, arms secured to the sides of said rack and extending rearwardly therefrom, anti-friction guide means on said carriage mounting said arms for fore and aft sliding movement relative to said carriage, hydraulic means including a cylinder supported on said carriage and an extending piston rod directly connected to said rack, a vertically movable blade member carried by said rack, and means carried by said rack for actuating said blade into and out of engagement with said jaw member.

4. In an industrial truck having a vertical mast at one end thereof, a load supporting carriage movable in said mast, said carriage having a pair of vertically spaced transverse face plates thereon, plate means extending forwardly from the lower plate for supporting a load thereon, a pusher rack disposed vertically above said plate means, means mounting said rack for fore and aft movement over said plate means including guiding and actuating means carried on the upper of said plates, and clamp means extending transversely along the lower edge of said rack and being adapted to clamp a sheet-like pallet.

5. The truck of claim 4 including hydraulically actuated means carried by said rack for engaging and releasing said clamp means.

6. The truck of claim 4 including means for centering said rack relative to said plate means during its fore and aft movement.

7. The truck of claim 4 including hydraulic means for actuating said clamp means, and hydraulic means associated with said mounting means for controlling said fore and aft movement of said rack.

8. A pusher rack for an industrial fork truck including means for moving said rack forwardly and rearwardly relative to said truck, and clamp means extending laterally the full width of said rack along the bottom thereof, said clamp means comprising a fixed horizontal jaw member, and a vertically movable blade member.

9. The rack of claim 8 including hydraulic cylinders carried by said rack and having pistons connected to said blade member.

10. The rack of claim 8 wherein said fixed jaw member has a groove extending the full length thereof, and said blade member has a rounded lower edge engageable in said groove when in clamping position.

11. In an industrial truck having a vertical mast at one end thereof, a load supporting carriage movable in said mast, said carriage having a pair of vertically spaced transverse face plates thereon, plate means extending forwardly from the lower plate for supporting a load thereon, a pusher rack disposed vertically above said plate means, means mounting said rack for fore and aft movement over said plate means including guiding and actuating means carried on the upper of said plates, and clamp means extending transversely along the lower edge of said rack and being adapted to clamp a sheet-like pallet, said transverse plates being detachable from said carriage to provide for removal of said plate means and rack therefrom.

12. In combination, an industrial truck, a telescopic mast at one end thereof, a load supporting carriage guided for vertical movement within said mast, a forwardly projecting load supporting surface at the bottom of said carriage, a pusher rack guided on said carriage for forward and retracting movement relative thereto above said surface, hydraulic means supported on said carriage for moving said rack, clamp means disposed along the lower edge of said rack and adapted to clamp a sheet-like pallet, hydraulic means for controlling the action of said clamp means, and pressure conduit means for both said hydraulic means and arranged to move conjointly with said carriage for operating said hydraulic means independently of the position of said carriage relative to said mast.

13. In combination with a load supporting carriage mounted for movement in the vertical mast of an industrial fork truck, a vertically disposed pusher rack having rigid rearwardly extending arms at the sides thereof, means on said carriage guiding said arms for conjoint fore and aft movement, a hydraulic cylinder on each side of said carriage supported at one end on said guiding means and extending rearwardly therefrom, piston means in said cylinders including extending rods rigidly connected to each side of said rack above said arms and adapted to actuate said rack forwardly and rearwardly relative to said carriage, clamp means carried by said rack and adapted to clamp a sheet-like pallet, hydraulic cylinders for actuating said clamp means, and conduits formed in said piston rods forming part of the fluid line for conducting fluid under pressure from said first named hydraulic cylinders to opposite ends of said clamp actuating cylinders.

14. In combination with a load supporting carriage mounted for movement in the vertical mast of an industrial fork truck, a vertically disposed pusher rack having rigid rearwardly extending arms at the sides thereof, means on said carriage guiding said arms for conjoint fore and aft movement, a hydraulic cylinder on each side of said carriage supported at one end on said guiding means and extending rearwardly therefrom, piston means in said cylinders including extending rods rigidly connected to each side of said rack above said arms and adapted to actuate said rack forwardly and rearwardly relative to said carriage, clamp means on said rack which is adapted to clamp a sheet-like pallet, hydraulic cylinders on said rack for actuating said clamp means, conduits leading from opposite ends of each cylinder to the associated piston rod end, and fluid conducting means within said rods selectively connected to said conduits.

15. In an industrial truck having a vertical mast at one end thereof with a load supporting carriage mounted for vertical movement in said mast, the combination of a vertically disposed pusher rack having rigid rearwardly extending arms at each side thereof, frame members at each side of said carriage, brackets pivotally mounted in each of said frame members and including a pair of rollers spaced longitudinally relative to said truck, means for adjusting said brackets about their pivots relative to said frame members to vary the plane through said roller axes relative to a horizontal plane, said rollers forming an anti-friction guide and support for said rack arms, and means supported solely on said brackets and including extensible and retractable members connected to said rack for moving said rack toward or away from said carriage.

GEORGE L. TURNER.
FRED SHERRIFF.

REFERENCES CITED

The following references are of record in the file of this patent:

UNITED STATES PATENTS

| Number | Name | Date |
|---|---|---|
| 1,451,879 | Lacke | Apr. 17, 1923 |
| 1,488,267 | Meyers | Mar. 25, 1924 |
| 1,771,060 | Remde | July 22, 1930 |
| 2,200,436 | Van Blarcom et al. | May 14, 1940 |
| 2,256,454 | Bomar | Sept. 16, 1941 |
| 2,270,664 | Weaver | Jan. 20, 1942 |
| 2,371,661 | Wilms | Mar. 20, 1945 |
| 2,388,458 | Alfonte | Nov. 6, 1945 |
| 2,468,424 | Brauch | Apr. 26, 1949 |